United States Patent
Staroske et al.

(10) Patent No.: US 11,590,820 B2
(45) Date of Patent: Feb. 28, 2023

(54) HYBRID MOTOR VEHICLE

(71) Applicant: AUDI AG, Ingolstadt (DE)

(72) Inventors: René Staroske, Ingolstadt (DE); Martin Arbesmeier, Altmannstein (DE)

(73) Assignee: AUDI AG, Ingolstadt (DE)

( * ) Notice: Subject to any disclaimer, the term of this patent is extended or adjusted under 35 U.S.C. 154(b) by 189 days.

(21) Appl. No.: 17/319,499

(22) Filed: May 13, 2021

(65) Prior Publication Data
US 2022/0016953 A1    Jan. 20, 2022

(30) Foreign Application Priority Data

Jul. 17, 2020  (DE) .................... 10 2020 118 921.4

(51) Int. Cl.
*B60H 1/00* (2006.01)
*F01N 3/027* (2006.01)
*B60H 1/20* (2006.01)

(52) U.S. Cl.
CPC ............... *B60H 1/004* (2013.01); *B60H 1/20* (2013.01); *F01N 3/027* (2013.01); *B60H 2001/00128* (2013.01)

(58) Field of Classification Search
CPC ........ B60H 1/004; B60H 1/20; B60H 1/2225; B60H 1/2218; B60H 1/04; B60H 2001/00128; B60H 2001/2287; B60H 2001/224; B60H 2001/2253; F01N 3/027; F01N 3/2013; F01N 2900/10; F01N 2900/104; F01N 2900/1602; F01N 9/00; F01N 2590/11; Y02A 50/20; Y02T 10/12; Y02T 10/40
See application file for complete search history.

(56) References Cited

U.S. PATENT DOCUMENTS

2015/0204620 A1\*  7/2015  Janzen ................... B23P 15/26
                                                                165/173
2019/0168576 A1\*  6/2019  Larson ............... B60H 1/00885

FOREIGN PATENT DOCUMENTS

DE        19804098 A1    8/1999
DE    102007037350 A1 \*  2/2009  .......... F01N 3/2026
(Continued)

OTHER PUBLICATIONS

German Examination Report issued on Jun. 17, 2021, in connection with corresponding DE Application No. 10 2020 118 921.4 (9 pp., including machine-generated English translation).

*Primary Examiner* — Emmanuel E Duke
(74) *Attorney, Agent, or Firm* — Maier & Maier, PLLC

(57) ABSTRACT

A hybrid motor vehicle, having an internal combustion engine, an electric motor, an interior climate-control device, a catalytic converter assigned to the internal combustion engine with a catalytic heating device which is operable from a medium-voltage network at a first voltage, particularly 48 V, a high-voltage network to which the electric motor is connected, at a second voltage that is higher than the first voltage, a voltage converter for converting the second voltage into the first voltage, a heat exchange device for heating a temperature-control medium, which is circulating in a temperature-control circuit, of the interior climate-control device by waste heat from the internal combustion engine, and a control device for operating the catalytic heating device as a function of the operation of the internal combustion engine.

20 Claims, 2 Drawing Sheets

(56) References Cited

FOREIGN PATENT DOCUMENTS

| | | | |
|---|---|---|---|
| DE | 102007037350 A1 | 2/2009 | |
| DE | 102012209202 A1 | 12/2012 | |
| DE | 102017126091 A1 * | 12/2017 | ............ B60W 10/06 |
| DE | 102017126091 A1 | 12/2017 | |
| DE | 102018111259 A1 | 11/2018 | |
| EP | 0766780 B1 * | 8/1998 | |
| EP | 2 000 366 A2 | 12/2008 | |
| EP | 2000366 A2 * | 12/2008 | ............ B60K 6/365 |
| JP | 2012-065504 A | 3/2012 | |
| WO | WO-2018108467 A1 * | 6/2018 | ............ B60K 28/10 |

\* cited by examiner

HYBRID MOTOR VEHICLE

FIELD

The invention relates to a hybrid motor vehicle, having an internal combustion engine, an electric motor, an interior climate-control device, a catalytic converter assigned to the internal combustion engine with a catalytic heating device that can be operated from a medium-voltage network at a first voltage, in particular 48 V, a high-voltage network to which the electric motor is connected, at a second voltage, which is higher than the first voltage, a voltage converter for converting the second voltage into the first voltage, a heat exchange device for heating a temperature-control medium circulating in a temperature-control circuit of the interior climate-control device by means of waste heat from the internal combustion engine, and a control device for operating the catalytic heating device as a function of the operation of the internal combustion engine.

BACKGROUND

Hybrid motor vehicles are characterized in that they have, in the drive train, both a particular conventional internal combustion engine and an electric motor, which can be used in both a generative and driving manner. The electric motor is usually connected to a high-voltage network of the hybrid motor vehicle, the high voltage of which can be, in particular, more than 200 V, for example 450 V. A high-voltage battery, from which the electric motor can be supplied, is usually also provided in the high-voltage network. In so-called plug-in hybrid motor vehicles, the hybrid motor vehicle also includes a charging device that allows the high-voltage battery to be charged, for example, via a corresponding charging column, a wall box, and/or a conventional house connection.

In modern motor vehicles, catalytic converters are usually assigned to internal combustion engines for processing the exhaust gases. Such catalytic converters begin to work effectively when a certain working temperature is reached. In order to allow effective use of the catalytic converter even at low temperatures, for example immediately after the internal combustion engine has been started, it has been proposed to provide the catalytic converter with a catalytic heating device, which can be designed as a heating disk, for example. Such a heating disk consists of a wound metal support which can be energized if necessary and is built into the housing of the catalytic converter.

The desirable heating power of such catalytic heating devices can, for example, be in the range of a few kilowatts, for example 4 kW. However, conventional vehicle electrical systems usually only provide a low voltage of 12 V, which means that an extremely high power supply would be required in order to be able to operate the catalytic heating device accordingly, which results in a corresponding design that is expensive and difficult to implement. It was therefore proposed, at least for hybrid motor vehicles, to operate the catalytic heating device at a medium voltage (intermediate voltage), in particular at 48 V. This medium voltage can be provided, for example, from the high-voltage network of the electric motor via a corresponding voltage converter and allows lower currents to be used and thus the requirements for the catalytic heating device and its supply lines to be significantly reduced. Such a design can be found in DE 198 04 098 A1, for example. According to DE 10 2012 209 202 A1, it was proposed, in an alternative approach, to use a regenerative braking system to provide the energy for heating a motor vehicle catalytic converter.

Hybrid motor vehicles usually also have interior climate-control devices, which are designed, in particular, to heat the interior to a pleasant temperature, which is in particular selectable by the occupant. For this purpose, it is known in classic motor vehicles that only have an internal combustion engine to transfer waste heat from the internal combustion engine, via a heat exchange device, to a temperature-control circuit that uses cooling water, for example, or optionally to the air to be supplied directly to the interior, in order to provide the desired heating. In the case of hybrid motor vehicles, however, no waste heat is generated for heating the interior space, at least when the hybrid motor vehicle is driven purely electrically. Accordingly, it has been proposed to operate the temperature-control medium, in particular cooling water, in the temperature-control circuit by means of a high-voltage resistance heater, in particular a high-voltage PTC, operated from the high-voltage network. Such a high-voltage heating device does not always have to be operated when the internal combustion engine generates corresponding waste heat, which is also dissipated via the water of the temperature-control circuit, which is also used to cool the internal combustion engine.

In addition to such possibilities for heating a temperature-control medium, the heat of which is then used to heat the air to be supplied to the interior, in particular by means of a heat exchanger, interior climate-control devices for known hybrid motor vehicles often also have a low-voltage heating device operated in the 12 V electrical system for the air to be supplied to the interior that is operated from the low-voltage electrical system and cannot itself provide sufficient power to provide sufficient, desired heat, but can be used for initial heating of the air when the internal combustion engine is cold and/or for readjusting/supplementing the heating activity at later times.

The known designs of hybrid motor vehicles have the problem that, with the high-voltage heating device, an additional component is required which is complex and takes up a lot of space in terms of design and safety requirements, since it is a high-voltage component which cannot always be integrated into the vehicle structure in current hybrid motor vehicles or only with losses.

SUMMARY

The invention is therefore based on the object of specifying a hybrid motor vehicle that is improved in comparison, in particular with regard to the required components and the space requirements.

To achieve this object, the invention provides for a hybrid motor vehicle of the type mentioned at the outset such that a climate-control heating device of the interior climate-control device operating at the first voltage is connected to the medium-voltage network, in which the control device for operating the climate-control device is formed from the medium-voltage network, at least when the internal combustion engine is not in operation and/or the catalytic heating device is not in operation.

The invention takes advantage of the fact that, particularly during research into the replacement of conventional 12 V electrical systems with 48 V electrical systems, climate-control heating devices have already been developed for air to be introduced into the interior of the motor vehicle, which can therefore work with an operating voltage of 48 V, which preferably corresponds to the first voltage (medium voltage). According to the invention, it has now been recognized that if a first voltage, which is between the second voltage (high voltage) of the high-voltage network and the third voltage (low voltage) of a low-voltage network (electrical system), is present anyway here in order to operate a catalytic heating device, this too can be used to operate such a climate-control heating device replacing a 12 V heating device at the first voltage. This applies, in particular, to the further knowledge that the climate-control heating device is not required precisely when the catalytic heating device is being operated, since the internal combustion engine then provides waste heat. On the other hand, the catalytic heating device is usually not required or only with very low power when the electric motor, which does not provide waste heat, is used, and consequently the climate-control heating device of the interior climate-control device is required to provide the desired interior heating. In other words, when the electric motor is operated by means of the voltage converter, the first voltage is present in the medium-voltage network, even if the catalytic heating device is currently not needed (or only to a very small extent), so that ultimately the voltage converter to provide the first voltage from the second voltage can be supplied for a different purpose.

In the hybrid motor vehicle according to the invention, which in particular also has an electrical system at a third voltage that is lower than the first or the second voltage, in particular is 12 V, the fact that a medium voltage is available, namely the first voltage, which is between the second voltage and the third voltage, to provide a replacement means for the common 12 V heating device of the interior climate-control device and the high-voltage heating device for the temperature-control means, so that, by providing the air to be supplied to the interior of the motor vehicle when the current is sufficiently low, the high-voltage heating device, which was operated at the second voltage of the high-voltage network, in particular thus the high-voltage PTC heater, can be dispensed with. This in turn means that a significant reduction in costs and weight is possible and, moreover, more installation space is made available in the hybrid motor vehicle for other components or as space that can be used by the occupants.

Since the present invention is used with particular advantage in a plug-in hybrid motor vehicle (PHEV—Plug-In Hybrid Electric Vehicle), it is of course also possible to use it in other hybrid motor vehicles, for example mild hybrids using a 12 V electrical system.

In the context of the present invention, there are essentially two operating scenarios. In a first operating state, the internal combustion engine is switched off or cold and the hybrid motor vehicle is driven electrically using the electric motor. The internal combustion engine then does not generate any waste heat for heating the interior of the hybrid motor vehicle, since the hybrid motor vehicle is driven purely electrically. It is not necessary to heat the catalytic converter because the internal combustion engine does not produce any exhaust gases that would have to be cleaned. All the power for the climate-control heating device can then be used, via the voltage converter, in order to bring about heating of the interior.

In a second operating state, the internal combustion engine is switched on or warm, so that waste heat is generated by the combustion, which is removed via the temperature-control circuit, in particular the cooling water, and this heats the interior of the motor vehicle via, for example, a heat exchanger of the interior climate-control device. The voltage converter therefore does not have to be used to heat the interior, which means that it is in operation for heating the catalytic converter via the catalytic heating device and heats up the catalytic converter as quickly as possible in order to enable the catalytic converter to become effective quickly.

In this case, the control by the control device naturally takes place in accordance with the particularly user-side specifications of the interior climate-control device, for example of a selected, desired interior temperature.

As already indicated, the climate-control heating device is particularly advantageously a climate-control heating device designed to heat air to be introduced into an interior space to be heated. The air to be introduced into the interior to be heated can be heated either by means of the temperature-control circuit, in particular from the cooling water of the internal combustion engine, or by means of the climate-control heating device operated at the first voltage. In particular, the interior climate-control device can therefore also have a further heat exchange device for transferring heat from the temperature-control medium heated by the waste heat from the engine to the air for heating the interior space.

The climate-control heating device can particularly advantageously be or comprise a resistance heater, in particular a PTC heater (PTC—Positive Temperature Coefficient). As already mentioned, such climate-control heating devices have already been developed for vehicles in which a 48 V electrical system is used instead of a 12 V electrical system, so that the corresponding components can then be used as identical parts both in the hybrid vehicle according to the invention and in vehicles that essentially work with a 48 V electrical system.

As already mentioned, the control device can be formed for the exclusive operation of the catalytic heating device or the climate-control heating device in at least two first operating modes. This means, in particular, that when the internal combustion engine is switched off (and in particular cold) and the electric motor is used, the climate-control heating device can be operated, whereas when the internal combustion engine is operated and providing waste heat, only the catalytic heater can be used. In the context of the present invention, however, it is also conceivable that the control device is formed for simultaneous operation of the catalytic heating device and the climate-control heating device from the medium-voltage network, in at least one operating mode. This means that a mixed form of the operating states already discussed above is conceivable, in which, for example, the catalytic converter is kept warm while, at the same time, the interior is to be heated by means of the climate-control heating device. The voltage converter is to be dimensioned accordingly with regard to its output power, for example to operate both heating devices, possibly with reduced but sufficient heating power in each case. Specifically, it can be provided, for example, that the control device is formed to operate the catalytic heating device, in the second operating mode, with reduced heating power in order to maintain a minimum temperature of the already heated catalytic converter. In this case, the corresponding second operating mode would be a type of heat-retention mode, which can lead to overall energy savings.

In order to carry out the appropriate use of the catalytic heating device and the climate-control heating device, the control device can have at least one switching device for switching the power supplies to the catalytic heating device and the climate-control heating device. For example, the at least one switching device can be connected accordingly downstream of the voltage converter. If it is not regarded as part of the control device, the switching device can also be implemented outside the control device.

BRIEF DESCRIPTION OF THE FIGURES

Further advantages and details of the present invention will be apparent from the exemplary embodiments described below and in reference to the drawings. The following is shown.

DETAILED DESCRIPTION

Figure 1:
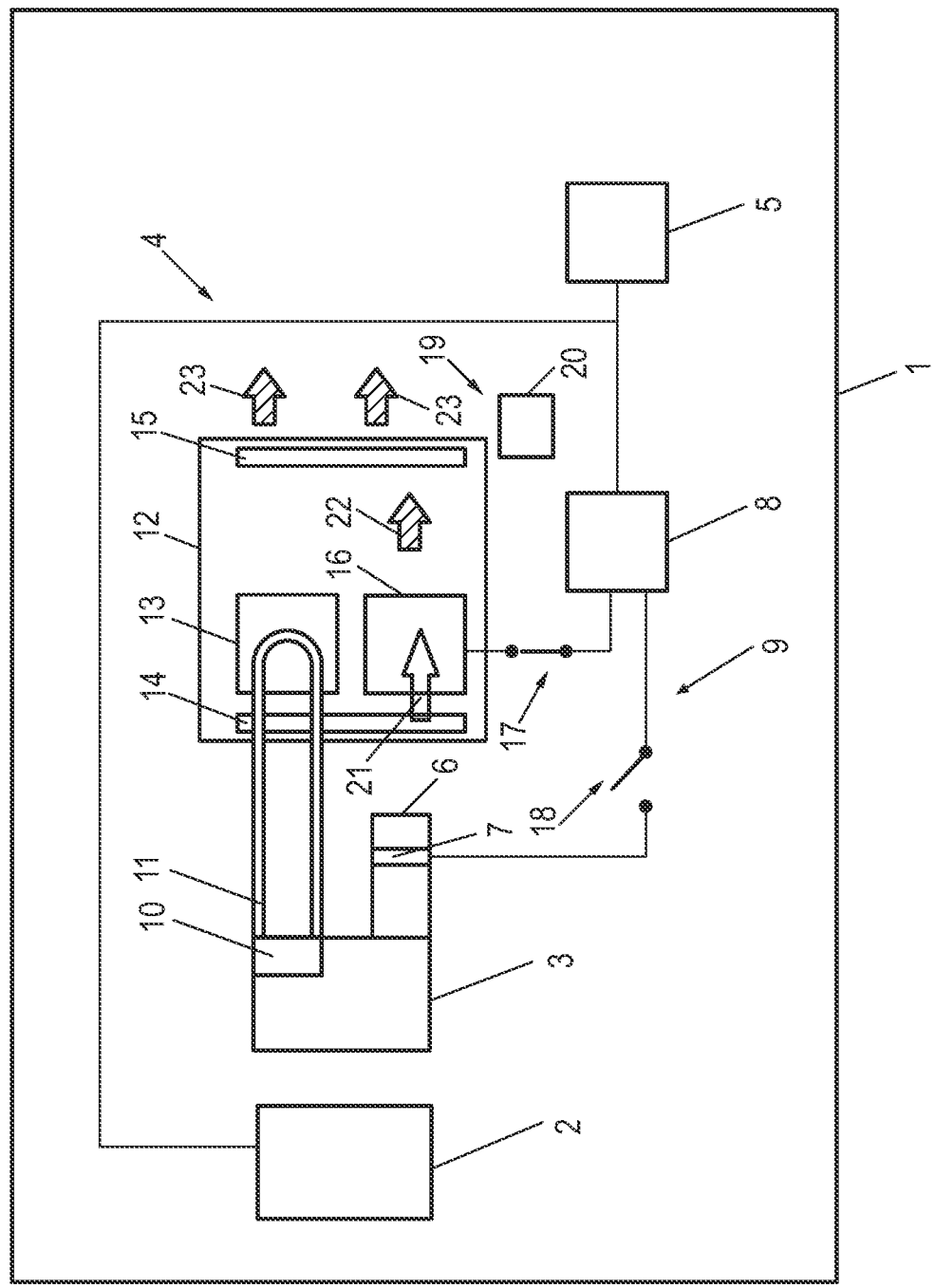
FIG. 1 a hybrid motor vehicle according to the invention in a first operating state.

FIG. 1 shows a schematic diagram of a hybrid motor vehicle 1 according to the invention. It has both an electric motor 2 and an internal combustion engine 3 in the drive train. The electric motor 2 is connected to a high-voltage network 4, which is at a second voltage (high voltage). A high-voltage battery 5 is also connected to the high-voltage network 4 and can be charged via a charger (not shown in detail), such that the hybrid motor vehicle 1 is a plug-in hybrid motor vehicle.

A catalytic converter 6 is assigned to the internal combustion engine 3 and has a catalytic heating device 7 designed here as a heating disk. The catalytic heating device 7 is to be operated at a first voltage (medium voltage), which is obtained from the second voltage of the high-voltage network 4 by means of a voltage converter 8, such that the voltage converter 8 therefore provides the first voltage for a medium-voltage network 9. The hybrid motor vehicle 1 also has an electrical system (low-voltage network), not shown in greater detail for the sake of clarity, the third voltage of which is lower than the first voltage and the second voltage. In one example, the first voltage may be 48 V, the second voltage 450 V, and the third voltage 12 V.

The internal combustion engine 3 is also coupled to a temperature-control circuit 11 via a heat exchange device 10, so that waste heat from the internal combustion engine 3 can be used during its operation to heat a temperature-control medium, which is cooling water in this case. By means of a further heat exchanger device 13, this heat can be used in an interior climate-control device 12 for heating air to be supplied to an interior of the motor vehicle 1. This interior climate-control device 12 accordingly comprises an air source 14 for outside air and/or circulated interior air as well as a distributor device 15 for distributing the heated air in the interior of the hybrid motor vehicle 1 in order to achieve its heating.

In the present case, however, the interior climate-control device 12 also comprises an electrical climate-control heating device 16, which can also be used for heating air to be supplied to the interior. The climate-control heating device 16 is designed as a PTC heater and is also operated at the first voltage generated by the voltage converter 8, which is 48 V here. Both the catalytic heating device 7 and the climate-control heating device 16 can be supplied with current and thus corresponding electrical power by the voltage converter 8 via switching devices 17, 18 of a control device 19, which may also comprise a control device 20, which is shown schematically here.

Figure 2:
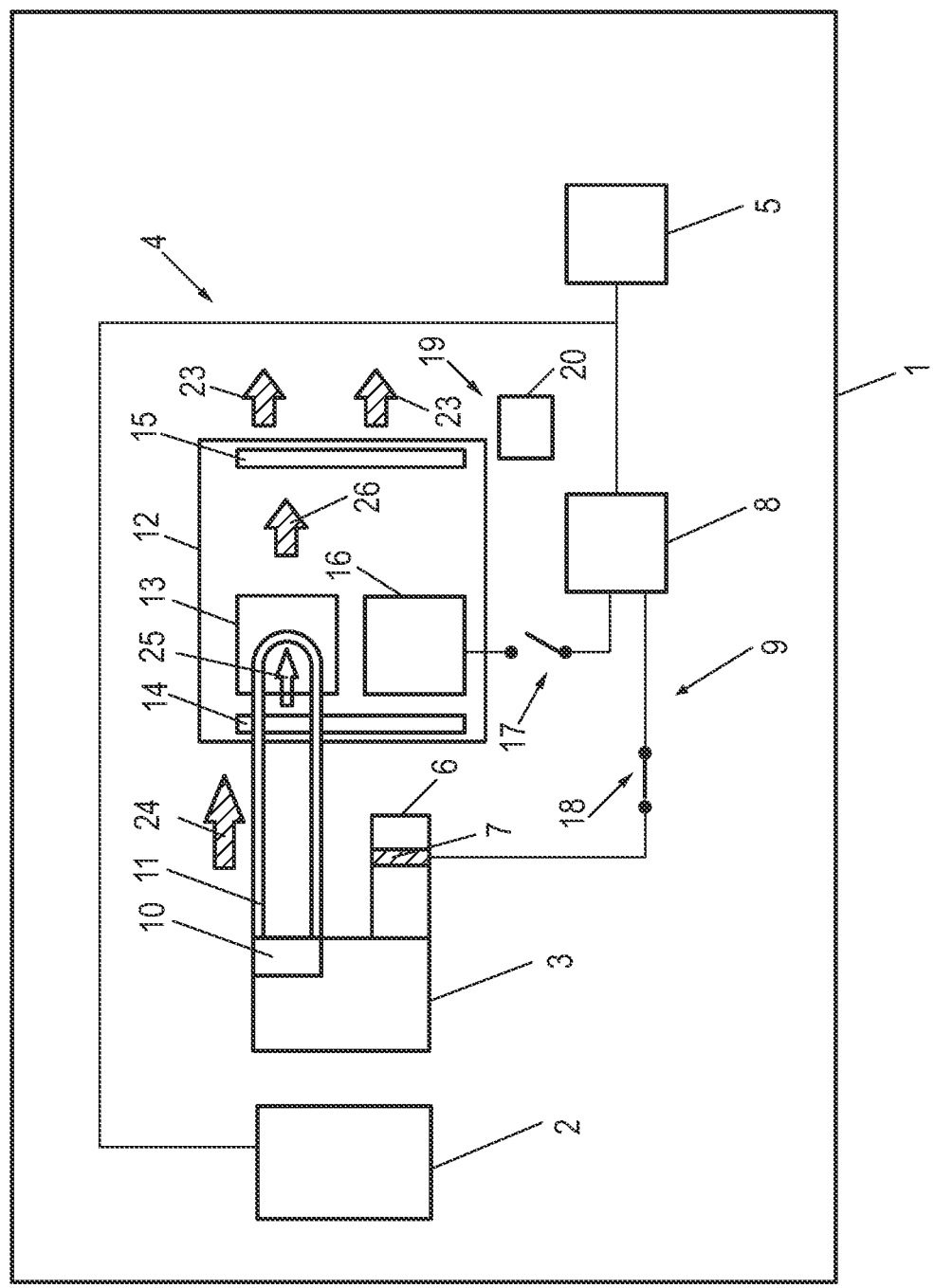
FIG. 2 the hybrid vehicle according to the invention in a second operating state.

In both operating states shown in FIGS. 1 and 2, the interior is then to be heated, which can be selected, for example, by an occupant of the hybrid motor vehicle 1 via a corresponding operating device. In the first operating state according to FIG. 1, the internal combustion engine 3 is not used and is cold. The electric motor 2 is used for driving. Accordingly, no heat is given off to the temperature-control circuit 11, which means that the further heat exchanger device 13 cannot be used to heat air from the air source 14 to be supplied to the interior of the motor vehicle 1. On the other hand, no exhaust gases are produced either, which means that the catalytic converter 6 does not have to be heated and consequently the catalytic heating device 7 does not have to be operated. As shown on the basis of the switching devices 17 and 18, the control device 19 is designed to energize the climate-control heating device 16 exclusively in this operating state, so that, despite the absence of waste heat from the internal combustion engine 3, air according to arrow 21 can be heated by the climate-control heating device 16, see arrow 22, and can be output, via the air distribution device 15, to the interior of the motor vehicle 1, see arrow 23. This does not require a high-voltage heating device for the cooling water of the temperature-control circuit 11, as is the case with conventional hybrid motor vehicles.

FIG. 2 shows a second operating state in which the internal combustion engine 3 is operated and therefore waste heat is introduced into the temperature-control circuit 11 according to arrow 24. Thus, in this case, see arrows 25 and 26, air to be introduced into the interior can be heated by means of the further heat exchanger device 13, while the climate-control heating device 16, see the position of the switching device 17, is not operated. Instead, the catalytic heating device 7, see position of the switching device 18, is supplied with electrical power for heating the catalytic converter 6 from the voltage converter 8 by means of the control device 19.

In addition to the operating modes shown in FIGS. 1 and 2, in which either the climate-control heating device 16 or the catalytic converter heating device 7 is operated exclusively, mixed states are also conceivable, for example an operation of the catalytic converter heating device 7 with reduced power in order to maintain a certain minimum temperature while at the same time air is heated for the interior by the climate-control heating device 16. Other such second operating modes can of course also be implemented accordingly by the control device 19.

The invention claimed is:

1. A hybrid motor vehicle, comprising: an internal combustion engine, an electric motor, an interior climate-control device, a catalytic converter assigned to the internal combustion engine with a catalytic heating device that can be operated from a medium-voltage network at a first voltage, in particular 48 V, a high-voltage network to which the electric motor is connected at a second voltage, which is higher than the first voltage, a voltage converter for converting the second voltage into the first voltage, a heat exchange device for heating a temperature-control medium, circulating in a temperature-control circuit, of the interior climate-control device by waste heat from the internal combustion engine, and a control device for operating the catalytic heating device as a function of the operation of the internal combustion engine, wherein a climate-control heating device of the interior climate-control device operating at the first voltage is connected to the medium-voltage network, wherein the control device for operating the climate-control heating device is formed from the medium-voltage network, at least when the internal combustion engine is not in operation and/or the catalytic heating device is not in operation.

2. The hybrid motor vehicle according to claim 1, wherein the hybrid motor vehicle also has an electrical system at a third voltage that is lower than the first and the second voltage, in particular 12 V.

3. The hybrid motor vehicle according to claim 2, wherein the climate-control heating device is designed to heat air to be introduced into an interior space to be heated.

4. The hybrid motor vehicle according to claim 2, wherein the climate-control heating device is a resistance heater, in particular a PTC heater (PTC-Positive Temperature Coefficient).

5. The hybrid motor vehicle according to claim 2, wherein the control device is formed from the medium-voltage network in at least two first operating modes for the exclusive operation of the catalytic heating device or the climate-control heating device and/or in at least one second operating mode for the simultaneous operation of the catalytic heating device and the climate-control heating device.

6. The hybrid motor vehicle according to claim 2, wherein the control device has at least one switching device for switching the power supplies to the catalytic heating device and the climate-control heating device.

7. The hybrid motor vehicle according to claim 1, wherein the climate-control heating device is designed to heat air to be introduced into an interior space to be heated.

8. The hybrid motor vehicle according to claim 7, wherein the interior climate-control device also has a further heat exchange device for transferring heat from the temperature-control medium heated by the waste heat from the combustion engine to the air for heating the interior space.

9. The hybrid motor vehicle according to claim 8, wherein the climate-control heating device is a resistance heater, in particular a PTC heater (PTC-Positive Temperature Coefficient).

10. The hybrid motor vehicle according to claim 8, wherein the control device is formed from the medium-voltage network in at least two first operating modes for the exclusive operation of the catalytic heating device or the climate-control heating device and/or in at least one second operating mode for the simultaneous operation of the catalytic heating device and the climate-control heating device.

11. The hybrid motor vehicle according to claim 8, wherein the control device has at least one switching device for switching the power supplies to the catalytic heating device and the climate-control heating device.

12. The hybrid motor vehicle according to claim 7, wherein the climate-control heating device is a resistance heater, in particular a PTC heater (PTC-Positive Temperature Coefficient).

13. The hybrid motor vehicle according to claim 7, wherein the control device is formed from the medium-voltage network in at least two first operating modes for the exclusive operation of the catalytic heating device or the climate-control heating device and/or in at least one second operating mode for the simultaneous operation of the catalytic heating device and the climate-control heating device.

14. The hybrid motor vehicle according to claim 7, wherein the control device has at least one switching device for switching the power supplies to the catalytic heating device and the climate-control heating device.

15. The hybrid motor vehicle according to claim 1, wherein the climate-control heating device is a resistance heater, in particular a PTC heater (PTC-Positive Temperature Coefficient).

16. The hybrid motor vehicle according to claim 15, wherein the control device is formed from the medium-voltage network in at least two first operating modes for the exclusive operation of the catalytic heating device or the climate-control heating device and/or in at least one second operating mode for the simultaneous operation of the catalytic heating device and the climate-control heating device.

17. The hybrid motor vehicle according to claim 1, wherein the control device is formed from the medium-voltage network in at least two first operating modes for the exclusive operation of the catalytic heating device or the climate-control heating device and/or in at least one second operating mode for the simultaneous operation of the catalytic heating device and the climate-control heating device.

18. The hybrid motor vehicle according to claim 17, wherein the control device is formed with reduced heating power in order to maintain a minimum temperature of the already heated catalytic converter in the second operating mode for operating the catalytic heating device.

19. The hybrid motor vehicle according to claim 1, wherein the control device has at least one switching device for switching the power supplies to the catalytic heating device and the climate-control heating device.

20. The hybrid motor vehicle according to claim 1, wherein the hybrid motor vehicle is designed as a plug-in hybrid motor vehicle.

* * * * *